Figure 1:
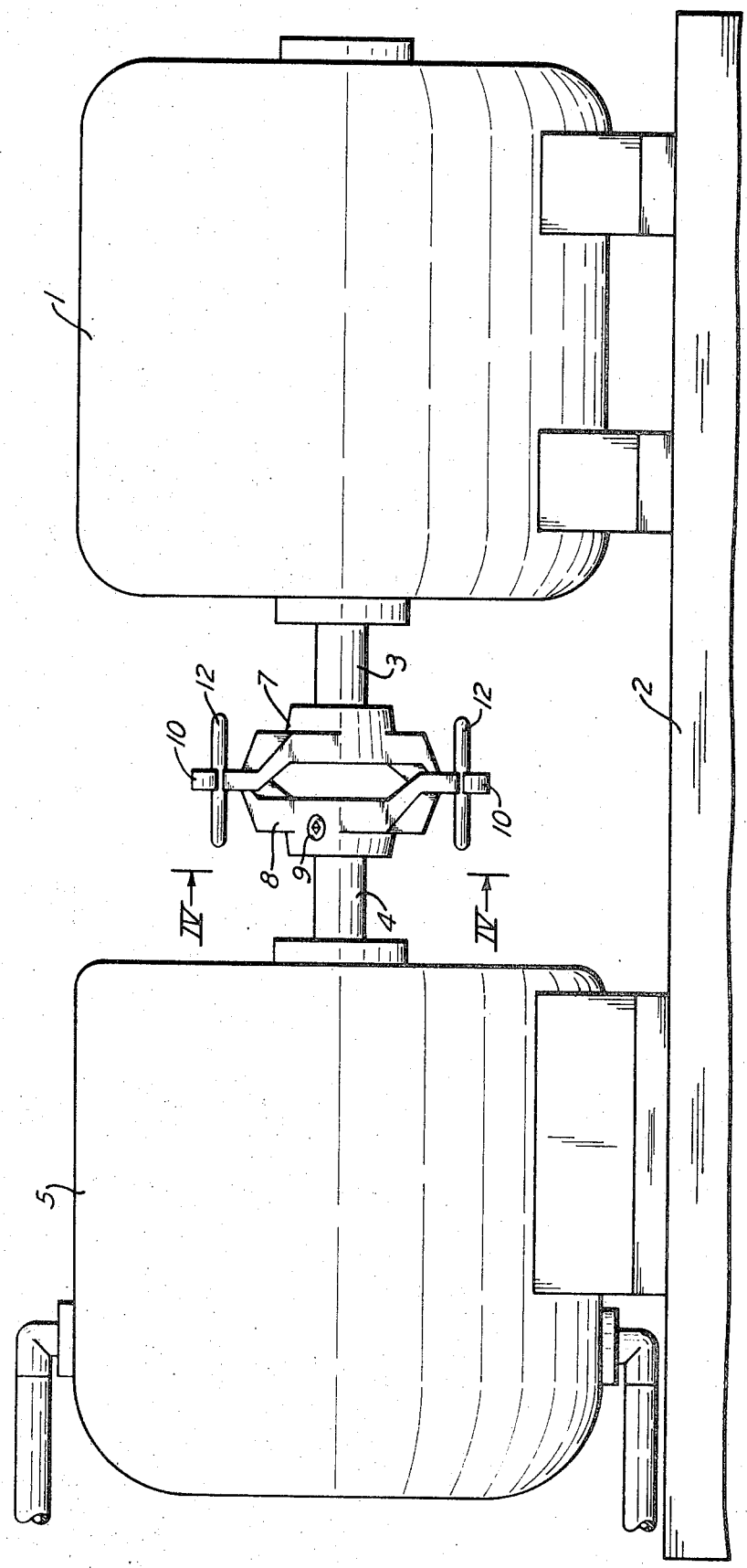

United States Patent [19]
Rice

[11] 3,851,498
[45] Dec. 3, 1974

[54] FLEXIBLE COUPLING
[76] Inventor: Sherman L. Rice, 511 Azalea Ave., East Liverpool, Ohio 43920
[22] Filed: May 22, 1973
[21] Appl. No.: 362,809

[52] U.S. Cl. .......................... 64/12, 64/11 R, 64/13, 64/19
[51] Int. Cl. ............................................. F16d 3/62
[58] Field of Search ........ 64/12, 13, 19, 11, 27 NM, 64/27 R

[56] References Cited
UNITED STATES PATENTS

| | | | |
|---|---|---|---|
| 1,114,326 | 10/1914 | Allen | 64/12 |
| 1,316,903 | 9/1919 | Kuentzel | 64/19 |
| 1,602,912 | 10/1926 | Leipert | 64/12 |
| 2,158,100 | 5/1939 | Barrett | 64/11 R |

FOREIGN PATENTS OR APPLICATIONS

| | | | |
|---|---|---|---|
| 700,184 | 11/1940 | Germany | 64/12 |
| 303,013 | 1/1955 | Switzerland | 64/12 |
| 484,044 | 8/1953 | Italy | 64/19 |
| 1,120,269 | 7/1956 | France | 64/12 |

*Primary Examiner*—Samuel Scott
*Assistant Examiner*—Randall Heald
*Attorney, Agent, or Firm*—Brown, Murray, Flick & Peckham

[57] ABSTRACT

A flexible coupling for a pair of aligned rotatable shafts includes a pair of separate arms crossing each other at an oblique angle and provided centrally with means for rigidly mounting them on the adjacent ends of the shafts. The ends of one arm are connected to the adjacent ends of the other arm by a pair of resilient O-rings so that when one of the arms is rotated by its shaft the rings will be put under tension to cause the other arm to rotate in the same direction.

8 Claims, 4 Drawing Figures

FLEXIBLE COUPLING

This invention relates to a flexible coupling that is especially useful in motor-pump units, but it can be used in many other places where it is desired to connect drive and driven shafts by means of a coupling that will permit one shaft to rotate a few degrees relative to the other shaft, such as when the drive shaft starts up. A flexible coupling of this general type is shown in U.S. Pat. No. 3,063,262, in which a pair of separate crossed arms are connected by metal leaf springs having a spreader bar between them. These arms are rigidly mounted on aligned shafts, one of which drives the other. When the drive shaft starts up, the arm carried by it rotates a few degrees before the leaf springs, which tend to straighten during this movement, exert enough pull on the other arm to cause it to start the other shaft rotating. As the driven shaft gathers speed, the two springs tend to return to their original sinuous shape. Such a coupling requires parts in addition to the arms and springs. These additional parts are rubber grommets mounted on lugs projecting laterally from the arms, and either an equalizer bar attached to the centers of the leaf springs or an equalizer sleeve encircling the central portions of the springs. All of this adds to the cost and complexity of the coupling. In place of leaf springs, coil springs have been used but they are even less desirable because their ends that are hooked through holes in the ends of the arms gradually wear through the arms and pull away from them. Then the entire coupling has to be replaced, which means that it must be disconnected from the shafts and a new coupling connected to them.

A further disadvantage of leaf or coil springs in a flexible coupling between the shafts of a motor-pump unit, for example, is due to over-oiling the motor. The oil destroys the rubber mounts through which the motor shaft extends, thereby allowing that shaft to move out of alignment with the pump shaft. The coupler arms then lurch back and forth relative to each other, which causes extensive wear on the coupler.

It is among the objects of this invention to provide a flexible coupling of the general type referred to above, which consists of only two parts in addition to the arms, which is simple and inexpensive in construction, which has an extremely long life, which can quickly be repaired by almost anyone if repair ever should become necessary, and in which the arms are not subjected to any wear.

Figure 2:
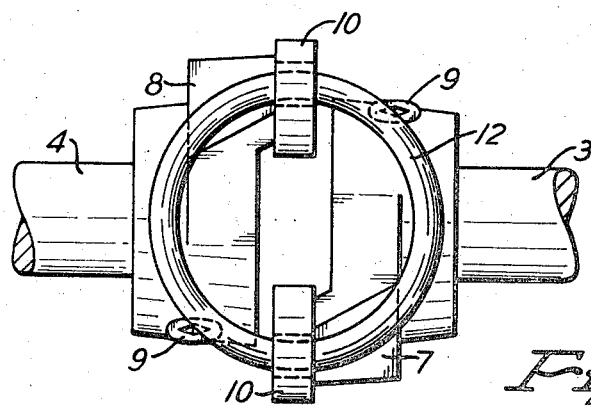
Figure 3:
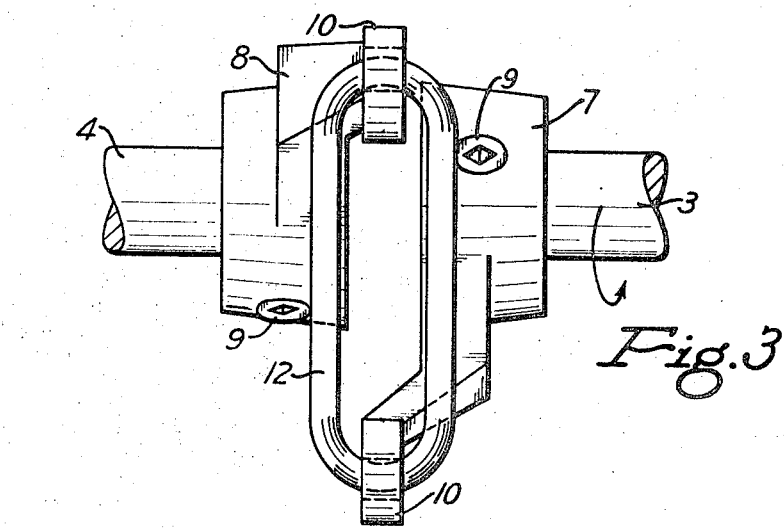
Figure 4:
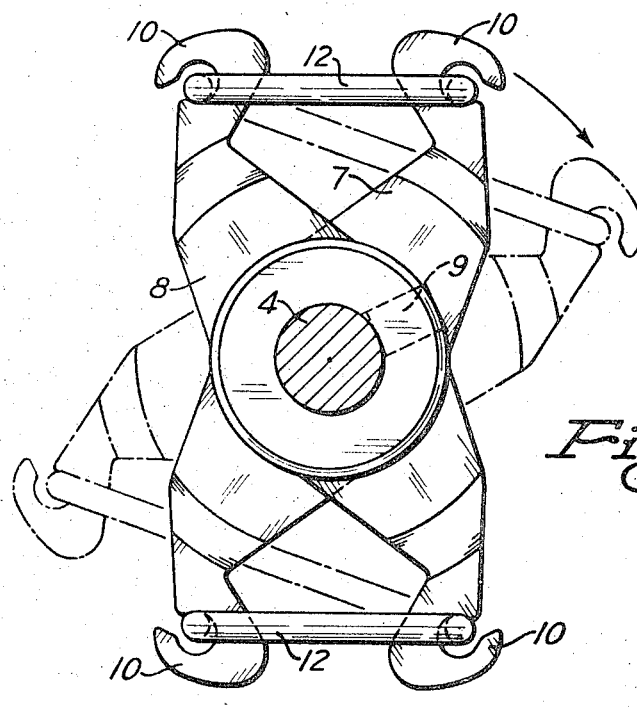

The preferred embodiment of the invention is illustrated in the accompanying drawings, wherein the coupling is shown connecting a motor with a pump, FIG. 1 being a side view;

FIG. 2 an enlarged plan view of the coupling shown in FIG. 1;

FIG. 3 is a view similar to FIG. 2, but showing the motor shaft starting to rotate just before the pump shaft starts to follow it; and FIG. 4 being a view taken on the line IV—IV of FIG. 1.

Referring to FIG. 1 of the drawings, a motor 1 mounted on any suitable support 2 is provided with a drive shaft 3 aligned with the shaft 4 of a rotary pump 5 of any desired construction. One place where this invention is particularly applicable is in connection with the motor-pump units used in hot water heating systems for heating houses. Over a period of 24 hours, such a unit starts and stops a great many times, so it is the practice to connect the motor and pump shafts by means of a flexible coupling in order that the motor shaft will be able to get under motion before it is subjected to the load of the pump.

The flexible coupling that connects the two shafts in accordance with this invention includes two rigid arms 7 and 8 of metal or plastic which can be made identical to each other. Each arm has a central body with an axial opening through it for receiving the end of one of the shafts. As shown in FIG. 4, the body is also provided with a threaded radial opening in which there is a set screw 9 so that the arm can be rigidly mounted on the shaft. The two arms cross each other at an oblique angle. Each arm also has diametrically opposite radially extending portions terminating in integral hooks 10. The entrance of the notch in each hook is smaller than the inner end of the notch. The hooks of the two arms are offset axially relative to the central portions of the arms, with all of the hooks in substantially the same vertical plane. The notch of each hook faces away from the notch in the adjacent hook of the other arm.

Another feature of this invention is that the ends of one arm are connected to the adjacent ends of the other arm by a pair of conventional resilient O-rings 12 extending through the hooks in substantially parallel planes parallel to the axis of the shafts. Each ring is made of an artificial rubber, such as neoprene. The rings can be deformed from their normal circular configuration, and even stretched somewhat, but upon release they will return to their original shape and size. The rings are slightly larger in cross section than the entrances to the hook notches so that it requires a little pressure to force them into the notches, from which they then cannot escape. The rings fit loosely in the inner ends of the notches.

OPERATION

When the motor starts to operate, its shaft 3 rotates the coupling arm 7 attached to it. Due to the resistance of the pump shaft to turning, the arm 8 mounted on it will remain stationary for a moment, whereby as shown in FIG. 3 and in dotted lines in FIG. 4 the other arm will stretch the two O-rings into elongated shape until their resistance to further deformation overcomes the resistance of the pump shaft. The tension on the flexible rings transmitted to the ends of the pump shaft coupling arm 8 will then cause it to rotate to drive the pump shaft. As soon as the speed of the pump shaft begins to match that of the drive shaft, the tendency of the O-rings to return to their circular shape may bring the ends of the pump shaft arm a little closer to the ends of the other arm 7, but the rings will not fully relax until the motor stops.

Since the O-rings are made of a rubber-like material, they do not wear the arms to which they are attached, even if the two shafts get out of alignment. Also, after long use the rings themselves do not show any evidence of wear. This is partly due to the fact that as the motor starts and stops the rings tend to rotate on their axes. This is a circumferential creeping of the rings through the hooks, so that as time goes by the entire circumference of a ring may be subjected to engagement by the hooks at one time or another. It has been found that this creeping of the rings can be facilitated by coating them with a suitable lubricant. This should be a lubricant that does not attack the material of the rings and that will not be thrown off them by centrifugal force as the coupling rotates at high speed. A suitable lubricant is silicone grease, which will remain effective for its intended purpose on the rings for a long period of time.

In addition to the non-wearing advantage of this coupling, it is very quiet because there are no metal-to-metal contacts between the arms of the coupling. The coupling consists of only the two arms and the two O-rings, the rings being readily available and inexpensive if for any reason one of them breaks. In such a cas it requires no skill at all to replace a broken ring with a new one and it takes only a moment. The arms of the coupling do not have to be disconnected from the shafts in order to replace the rings, and the arms should never require replacement.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A flexible coupling for a pair of aligned rotatable shafts, comprising a pair of separate arms crossing each other and provided centrally with means for rigidly mounting them on the adjacent ends of the shafts, and a pair of resilient O-rings connecting the ends of one arm to the ends of the other arm, the arms being shaped to hold said rings in place in substantially parallel planes substantially parallel to the axis of rotation of the arms, whereby when one of the arms is rotated by a shaft to put the rings under tension the rings will cause the other arm to rotate in the same direction.

2. A flexible coupling according to claim 1, in which the ends of the arms are provided with notches loosely receiving said rings, and the outer ends of the notches for each ring face away from each other and are narrower than the rings to thereby retain the rings in the notches.

3. A flexible coupling according to claim 1, in which the rings are free to turn on their axes relative to the arms, and said coupling includes a lubricant coating the rings.

4. A flexible coupling according to claim 3, in which said lubricant is silicone grease.

5. A flexible coupling according to claim 1, in which the ends of the arms are disposed in a common plane and are provided with notches loosely receiving the rings, and the coupling includes silicon grease coating the rings to facilitate turning of the rings on their axes.

6. A flexible coupling according to claim 1, in which there are only two of said crossed arms.

7. A flexible coupling according to claim 1, in which there are only two of said crossed arms and they cross each other at an oblique angle, each of said rings connecting the arm ends that are closest to each other.

8. A flexible coupling according to claim 5, in which there are only two of said crossed arms and they cross each other at an oblique angle, each of said rings connecting the arm ends that are closest to each other.

* * * * *